May 18, 1954
S. A. FOSTER
2,678,500
DUAL ACTING ELECTRIC SIZING GAUGE
Filed July 9, 1953
2 Sheets-Sheet 1
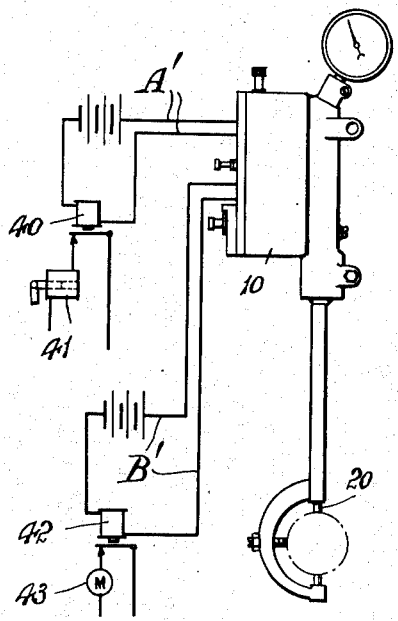
Fig. 1.
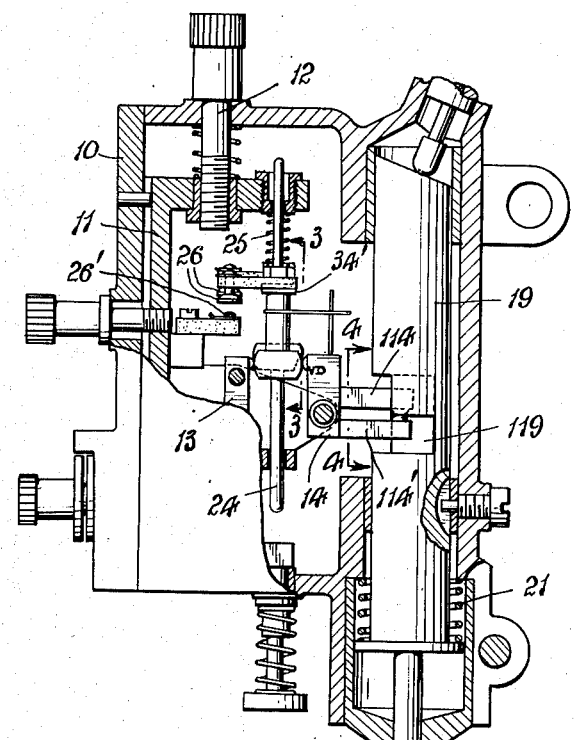
Fig. 2.
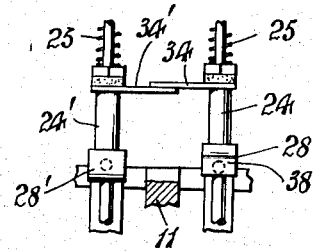
Fig. 3.
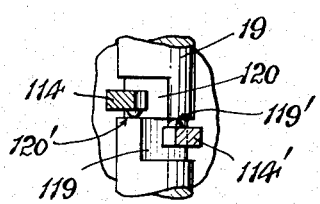
Fig. 4.
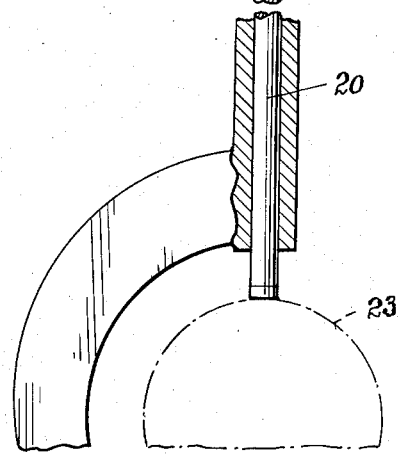
INVENTOR.
Shubel A. Foster.
BY
Stanley Lightfoot
Attorney.

May 18, 1954 S. A. FOSTER 2,678,500
DUAL ACTING ELECTRIC SIZING GAUGE
Filed July 9, 1953 2 Sheets-Sheet 2

INVENTOR.
Shubel A. Foster.
BY
Stanley Lightfoot
Attorney

Patented May 18, 1954

2,678,500

UNITED STATES PATENT OFFICE 2,678,500

DUAL ACTING ELECTRIC SIZING GAUGE

Shubel A. Foster, Royal Oak, Mich., assignor to The Foster Engineering Corporation, Royal Oak, Mich., a corporation of Michigan Application July 9, 1953, Serial No. 366,928

10 Claims. (Cl. 33—147)

This invention relates to a dual acting electric sizing gage which is particularly adapted for use in grinding and other machining operations.

The gage of this invention includes the general mechanical features of the mechanism described in my U. S. Patent No. 2,267,559, granted to me December 23, 1941. The patented device comprises a reciprocal plunger which may contact the work piece, and a mechanism coupled with the plunger adapted to control the motor for operating a grinding machine or the like and to automatically shut off the machine when the work piece has been sized down to some predetermined dimension.

More recently, I have filed a patent application Serial No. 304,080, filed August 13, 1952, in which I describe a further development of such type gage. In that case, I employ a duplex gage mechanism coupled to a single plunger which bears directly or indirectly upon a work piece. As the work piece decreases in dimension due to the grinding or machining action, the plunger moves and this movement regulates the operation of the two gage mechanisms. That application is particularly concerned with a means for regulating a differential action of the two gage mechanisms, which, not constituting any part of the present invention, will not be referred to herein.

As in the arrangement described in the above application, the present invention involves utilizing a dual gage mechanism operated by a single work contacting plunger. Each of said gage mechanisms controls separate electric circuits which in turn control the operation of the machine upon which the gage is applied.

For an example, if the gage were to be applied to a grinding machine, the plunger may be arranged to contact the work piece and to move as the work piece decreases in dimension. When the ground work piece reaches a predetermined dimension, one of the gage mechanisms would operate and turn on a control which slows down the speed of the grinding action. After a smaller predetermined size is reached, the second gage mechanism operates and shuts off the grinding action.

In this type duplex gage it is necessary to insure that the proper gage mechanism operates first and that both gage mechanisms do not act simultaneously. Due to the rough treatment a gage receives in the shop, it could be possible to sufficiently jar and loosen both gage mechanisms so that they would not operate in their proper sequence and so that they might jam and not operate at all; a condition which might occur when grinding out-of-round work.

Accordingly, it is an object of this invention to provide a means which interlocks both gage mechanisms and prevents the second mechanism from operating before or simultaneously with the first mechanism, as might happen where there is excessive jarring or where the work piece is excessively out of round.

In addition it is an object of this invention to provide a duplex gage mechanism coupled to a common work engaging plunger, wherein one gage mechanism is directly responsive to the plunger but the other mechanism is responsive to both the plunger and the first gage mechanism.

Another object of this invention is to provide a duplex gage mechanism coupled to a common plunger wherein one gage mechanism moves and operates an electric control in accordance with the movement of the plunger, and the other gage mechanism is free to oscillate and move with the movement of the plunger but will not operate its electric control until after the first control operates.

Yet another object of this invention is to provide a gage mechanism which is adapted to control one electric system when the piece being gaged is cut down to a predetermined size and to operate a second gage mechanism when the piece reaches a smaller size, but wherein means is provided to insure that both circuits cannot operate other than in proper sequence.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawings, wherein:

Figure 1 is a schematic drawing of the gage shown as applied to two electric circuits such as may control the operation of a grinding machine;

Figure 2 is a sectional elevation of the gage showing that part of the internal mechanism involving this invention;

Figure 3 is a fragmentary detailed view of the two reciprocal stems carrying the gage blocks which are part of the dual gage mechanism as viewed on a plane indicated by the line 3—3 in Figure 2;

Figure 4 is a detailed sectional view through the two arms which couple the dual gage mechanism to the gage plunger the section being taken on a plane indicated by the line 4—4 in Figure 2;

Similar characters of reference indicate similar parts in the several figures of the drawing.

Figure 5:
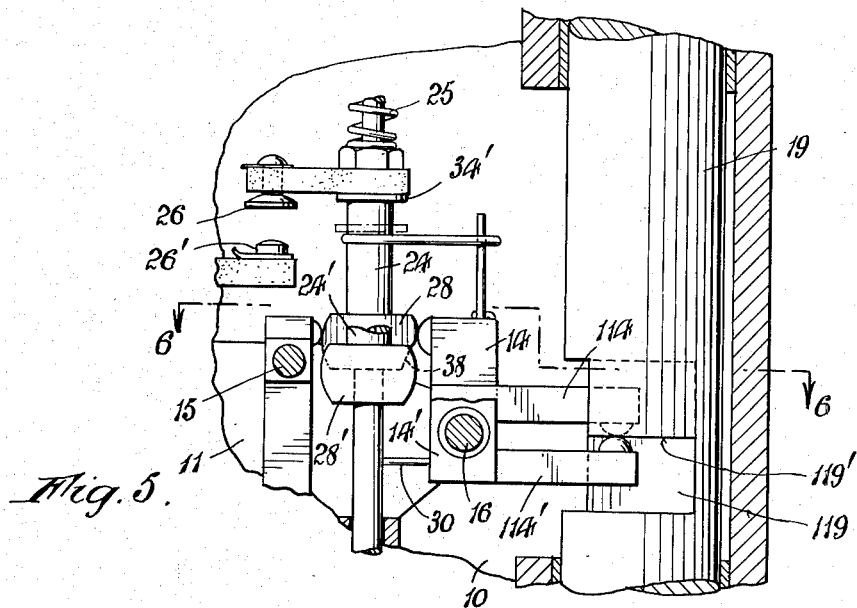
Figure 5 is a fragmentary detailed view on a larger scale than the previous figures showing the relationship of the principal operating members of the gage mechanism to each other and to the gage plunger.
Figure 6:
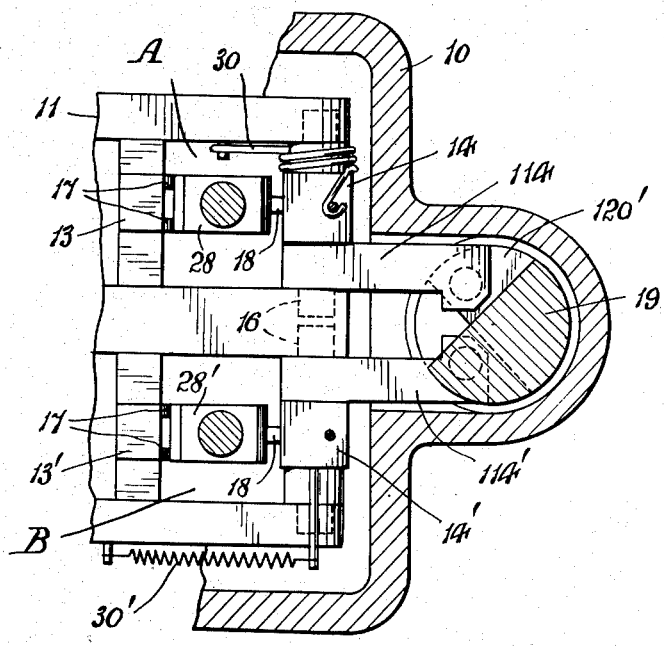
Figure 6 is a sectional plan view of the same taken on a plane indicated by the line 6—6 in Figure 5.

As in the type of gage described in my copending application Serial No. 304,080, the arrangement of my present application includes two gage mechanisms, generally indicated by the reference letters A and B, both of which are mounted on a common carrier 11 which is vertically adjustable in a casing 10 by means of the micrometer 12 (shown in Figure 2). Each of the said mechanisms A and B includes a pair of levers 13 and 14 in the case of the mechanism A and 13' and 14' in the case of the mechanism B (the said levers being hereinafter termed "gap elements") the gap elements 13 and 13' being pivoted at 15 and the gap elements 14 and 14' being pivoted at 16.

Each of the gap elements 13 and 13' is shown as being provided with a pair of rounded wear-resisting projections 17 while each of the gap elements 14 and 14' is similarly provided with a wear-resisting projection 18 whereby an adjustable gap is formed between the projections 17 and the projections 18 of each of the gap mechanisms A and B.

114 is a rearwardly extending arm connected to the pivot of the gap element 14 and swingable therewith as is a similar arm 114' connected to the pivot of the gap element 14'.

19 is a vertically reciprocal plunger carried by the upper end of a gage rod 20, which rod is biased in a downward direction by a compression spring 21 bearing upon the annular abutment 22, as shown, and this plunger 19 is notched at 119 and 120 to provide an upwardly directed abutment surface 120' and a downwardly directed abutment surface 119', which surfaces are indicated as being arranged in a common horizontal plane and against which the rearward ends of the arms 114 and 114' are urged by the action of springs 30 and 30'.

The lower end of the said gage rod 20 is intended, in use, to bear on the work 23 whereby it will operate on the said gage mechanisms A and B to regulate the spacing of the two systems of gap elements (and increase their spacing as the work becomes reduced in diameter as the result of a grinding operation).

As more particularly explained in my copending application Serial No. 304,080, it is intended that the adjustment of the two gage mechanisms may be set so that, for example, the gap opening of the mechanism A may reach a predetermined degree upon the work becoming ground to a final diameter, whereas the gap opening of the mechanism B could be set to reach a predetermined degree at a stage of grinding somewhat prior to the completion of the grinding operation for the purposes explained in the said copending application, which purposes will be again referred to in describing the operation of the present device.

As in the device described in my earlier Patent No. 2,267,559, the width of the spacing between the projections 17 and 18 of the two gage mechanisms A and B at any moment is determined by three factors: the vertical positioning within the casing 10 of the carrier 11 on which the gap members are all pivotally mounted; the vertical position of the plunger 19 determined by the diameter of the work on which the lower end of the gage rod 20 rests; and the angular position of the adjustment of the gap members 13 and 13' on their pivots 15 which is determined by micrometer means (not shown).

Each pair of gap members has arranged between it a vertically extending reciprocal stem 24 and/or 24', as the case may be, downwardly biased by the spring 25 and each of the said stems carries a switch contact 26 movable downwardly therewith to close upon a second switch contact 26' mounted on the carrier 11. The stems 24 and 24' have secured or mounted thereon gage blocks 28 and 28', respectively, having arcuate or similarly formed surfaces presented in the direction of the wear-resisting projections 17 and 18 of the respective gap elements 13 and 14, in the case of the gage mechanism A, and 13' and 14' in the case of the mechanism B; whereby downward motion of one or other of said gage blocks between and beyond the wear-resisting projections of the associated gap elements will close the respective contact 26 carried by the stem 24 or 24', as the case may be, upon its associated contact 26' to thereby close a circuit through the leads A' or B', according to which of the gage mechanisms A or B is operated to permit its gage block 28 or 28' to pass downwardly between its respective gap elements.

In the schematic drawing Figure 1, the said leads A' are shown as being electrically connected with a relay 40 controlling the operation of a solenoid 41, such as may be utilized in a grinding machine to operate controls (not shown) such as are well-known in the art for effecting a slowed-down grinding operation; and the leads B' are shown as being similarly connected with a relay 42 intended, when excited, to open an electric circuit through the motor 43 thereby shutting off the operation of the grinding machine with which the said motor is to be associated. The electrical arrangement is described merely for the purpose of indicating utility in the dual gage mechanism and should not be considered as constituting a new or patentable feature of the present invention.

Novelty in the present application resides in the unique arrangement of the arms 114 and 114' of the gap elements 14 and 14' wherein the rearward end of the arm 114 is urged by the spring 30 into downward contact with the upwardly directed abutment surface 120' of the plunger 19, while the rearward end of the arm 114' is urged by the spring 30' into upward contact with the downwardly directed abutment surface 119' of the said plunger 19. Thus downward movement of the said plunger 19, as the diameter of work is reduced in grinding, will normally move the gap elements 14 and 14' in unison away from the elements 13 and 13' so that the gage blocks 28 and 28' may drop through the resulting gaps as each reaches the predetermined spacing to permit such dropping movement.

It should be noted that the stem 24 of the gage block 28 is provided with a finger 34 which overlaps a similar finger 34' carried by the stem 24', so that in the position of the parts shown in the drawing, and more particularly in Figure 3, the finger 34', through the medium of the overlapping finger 34, supports the stem 24 and its gage block 28 with the said gage block 28 raised relative to the other block 28' to an extent whereby the plunger 19 may rise and fall to some extent causing the gap element 14 to oscillate on its pivot without causing a jamming of the gage mechanism such as could happen if the two gage blocks 28 and 28' inadvertently descended together; a condition which could otherwise arise where there is an excessive amount of out-of-roundness of the work to be contended with in the grinding operation.

To facilitate this slight free oscillating movement of the gap element 14, I show the lower portion 38 of the face of the gage block 28 as being recessed or cut away to afford some clearance in advance of the gap element 14 so that it may move in a gap-closing direction during out-of-roundness grinding, without being prevented from doing so by the presence of the said gage block 28, until such time as the gage block 28' has passed downwardly between the gap elements 13' and 14', at an eventual stage in the grinding operation, and closed its contacts 26 and 26'.

At the same time, the downward movement of the block 28' lowers the finger 34' from its position supporting the finger 34 of the gage mechanism A so that the gage block 28 is then free to descend and pass through the gap between the gap elements 13 and 14 whenever this gap shall have reached the desired degree controlled by the grinding of the work. This operation results in the eventual closing of the circuit B' for the purposes intended.

Thus, it will be seen that the gap elements 14 and 14', while both operated from the same plunger 19, are capable of a certain independent oscillation providing a safety feature in the dual mechanism and permitting the grinding of out-of-round work without danger of such simultaneous operation of the two mechanisms, under the conditions referred to, as might otherwise be quite undesirable.

This invention may be developed within the scope of the following claims without departing from the essential features of the said invention, and it is desired that the specification and drawing be read as being merely illustrative of a practical embodiment of the same and not in strictly limiting sense.

What I claim is:

1. In a dual acting gage, in combination, a work dimension responsive gap element, a first slidable stem having a gage block thereon which gage block rests on said gap element whereby movement of said gap element releases the block and permits the block and stem to slide past said gap element; a second work dimension responsive gap element, a second slidable stem having a gage block thereon, means on said first stem coacting with means on said second stem to hold said second gage block out of contact with the second gap element until the first gage block slides past its gap element.

2. In a dual acting gage, in combination, a work dimension responsive gap element, a first slidable stem having a gage block thereon, which gage block rests on said gap element whereby movement of said gap element releases the block and permits the block and stem to slide past said gap element; a second work dimension responsive gap element and a second slidable stem having a gage block thereon, coacting means on each of said stems to hold said second gage block out of contact with the second gap element until the first gage block slides past its gap element, after which said second gage block rests on its gap element until movement of that gap element permits sliding of the second gage block and stem.

3. In a dual acting gage, as defined in claim 2, wherein each of said stems is provided with an electric control actuating means whereby when said gage blocks slide past their respective gap elements one electric control will be operated before the other said control.

4. In a dual acting gage, in combination, a pair of pivoted gap elements arranged side by side, with an integral arm formed on each gap element, a work contacting reciprocal plunger having a pair of slots formed therein with one gap element arm fitted in one of said slots and contacting the top portion of said slot, and the other gap element arm fitted in and resiliently held in contact with the bottom of said other slot, whereby downward movement of the plunger pivots one gap element by pulling down on its arm, and permits the other gap element to pivot due to the resilient force on its arm.

5. In a dual acting gage, in combination, a pair of pivoted gap elements arranged side by side, a reciprocal work contacting plunger having a slot formed therein, an arm attached to each of said gap elements and entering into said slot, whereby movement of the plunger causes the gap elements to move; a pair of slidable stems, each coacting with a gap element whereby movement of said gap elements permits the stems to slide, and co-operating means on said stems to prevent sliding of one stem until after the other stem slides.

6. In a dual acting gage, in combination, a pair of pivoted gap elements arranged side by side, a reciprocal work contacting plunger having a slot formed therein, an arm attached to each of said gap elements and entering into said slot, whereby movement of the plunger causes the gap elements to move; a pair of slidable stems, each of said stems having a gage block thereon, with one of said gage blocks resting on one of said gap elements, coacting means on said stems to hold the gage block of the other said stem above the other gap element, whereby movement of said one gap element releases said one gage block to permit its stem to slide, after which the other gage block rests upon its respective gap element.

7. In a dual acting gage, in combination, a reciprocal work contacting plunger having a slot formed therein, a first pivoted gap element having an arm entering into said slot and contacting the top of said slot, a slidable stem having a gage block thereon resting on said gap element; a second pivoted gap element having an arm entering into said slot and resiliently urged to contact the bottom of said slot, a second slidable stem with a gage block thereon and adapted to rest on said second gap element; coacting means on said stems to hold said second gage block out of contact with said second gap element until said first gage block slides past its respective gap element, after which said second gage block is free to contact the second gap element and later slide past it.

8. In a dual acting gage, a reciprocal work contacting plunger having a slot formed therein, a pair of spaced gap elements, one fixed in position, the other being pivotally mounted and having an arm entering into said slot and resiliently urged in contact with the bottom of said slot whereby movement of the plunger permits the arm to move in the same direction as said plunger and pivot said pivotal gap element; a slidable stem having a gage block thereon, which gage block contacts the fixed gap element, said gage block being so dimensioned as to pass through the space between the gap elements part way and then contact the pivoted gap element.

9. In a dual acting gage as defined in claim 8, with a movable means responsive to said plunger, coacting with said stem to prevent the gage block from contacting said pivotal gap element until after said movable means moves.

10. In a dual acting gage, a reciprocal work contacting plunger having a slot formed therein, a pair of spaced gap elements, one fixed in position, the other being pivotally mounted and having an arm entering into said slot and resiliently urged in contact with the bottom of said slot whereby movement of the plunger permits the arm to move in the same direction as said plunger and pivot said gap element; a slidable stem having a gage block thereon, said gage block being positioned above the space between the two gap elements and resting upon the fixed gap element, said gage block being so dimensioned that the pivoted gap element may move and not contact the gage block until the gage block is lowered part way into said space.

References Cited in the file of this patent

UNITED STATES PATENTS

| Number | Name | Date |
|---|---|---|
| 763,011 | Mietaschk | June 21, 1904 |
| 915,671 | Hanson | Mar. 16, 1909 |
| 2,224,281 | Webber | Dec. 10, 1940 |
| 2,433,585 | Warner | Dec. 30, 1947 |